US012614836B2

(12) United States Patent
Cui et al.

(10) Patent No.: US 12,614,836 B2
(45) Date of Patent: Apr. 28, 2026

(54) DISPLAY PANEL AND DISPLAY APPARATUS

(71) Applicant: Suzhou Govisionox Innovation Technology Co., Ltd., Kunshan City (CN)

(72) Inventors: Shuang Cui, Langfang (CN); Rubo Xing, Langfang (CN); Qingrong Ren, Langfang (CN); Jie Wu, Langfang (CN)

(73) Assignee: Suzhou Govisionox Innovation Technology Co., Ltd., Kunshan City (CN)

( * ) Notice: Subject to any disclaimer, the term of this patent is extended or adjusted under 35 U.S.C. 154(b) by 120 days.

(21) Appl. No.: 18/497,200

(22) Filed: Oct. 30, 2023

(65) Prior Publication Data

US 2024/0063529 A1 Feb. 22, 2024

Related U.S. Application Data

(63) Continuation of application No. PCT/CN2022/113694, filed on Aug. 19, 2022.

(30) Foreign Application Priority Data

Dec. 27, 2021 (CN) .......................... 202111607714.5
Mar. 23, 2022 (CN) ......................... 202210286830.X

(51) Int. Cl.
*H01Q 1/24* (2006.01)
*G06F 3/044* (2006.01)
(Continued)

(52) U.S. Cl.
CPC ........... *H01Q 1/243* (2013.01); *G06F 3/0445* (2019.05); *G06F 3/0446* (2019.05); *H01Q 1/38* (2013.01);
(Continued)

(58) Field of Classification Search
CPC ....... H01Q 1/243; H01Q 1/38; H04M 1/0269; H04M 2250/22; G06F 3/0446; G06F 3/0445
See application file for complete search history.

(56) References Cited

U.S. PATENT DOCUMENTS

2014/0253830 A1* 9/2014 Li ......................... G06F 3/0443
349/12
2015/0138046 A1 5/2015 Moon
(Continued)

FOREIGN PATENT DOCUMENTS

CN 102882545 A 1/2013
CN 203720722 U 7/2014
(Continued)

OTHER PUBLICATIONS

International Search Report mailed on Nov. 11, 2022, in corresponding International Application No. PCT/CN2022/113694; 5 pages.
(Continued)

*Primary Examiner* — Hai V Tran
(74) *Attorney, Agent, or Firm* — Maier & Maier, PLLC

(57) ABSTRACT

A display panel and a display apparatus. The display panel includes a first display area and a second display area including a first area and at least one second area, a first antenna is arranged in the first area, a second antenna is arranged in the at least one second area. The display panel further includes a plurality of touch electrodes arranged in the first display area and the at least one second area. In the display panel and the display apparatus, first antennas and second antennas are integrated in the second display area of the display panel, so that both a display function and an antenna function can be achieved for the second display
(Continued)

area, which is beneficial for making a product light and thin and making a product have a high screen-to-body ratio.

16 Claims, 6 Drawing Sheets

(51) Int. Cl.
  *H01Q 1/38* (2006.01)
  *H04M 1/02* (2006.01)
(52) U.S. Cl.
  CPC ...... *H04M 1/0269* (2022.02); *H04M 2250/22* (2013.01)

(56) References Cited

U.S. PATENT DOCUMENTS

| | | | |
|---|---|---|---|
| 2018/0188432 A1 | 7/2018 | Choi et al. | |
| 2020/0067176 A1 | 2/2020 | Kim et al. | |
| 2020/0209995 A1* | 7/2020 | So ......................... | G06F 3/0443 |
| 2020/0227819 A1 | 7/2020 | Oh et al. | |
| 2021/0012078 A1 | 1/2021 | Chang et al. | |
| 2021/0103354 A1* | 4/2021 | Kim ...................... | G06F 1/1643 |
| 2021/0104582 A1 | 4/2021 | Kim et al. | |
| 2021/0200379 A1* | 7/2021 | Youk ..................... | G06F 3/0443 |
| 2021/0263606 A1 | 8/2021 | Lee | |
| 2021/0297517 A1* | 9/2021 | Yim ....................... | G09G 3/035 |
| 2021/0328328 A1* | 10/2021 | Sung ........................ | H01Q 1/44 |
| 2021/0358996 A1 | 11/2021 | Lee et al. | |
| 2022/0109229 A1* | 4/2022 | Kim ....................... | H01Q 1/364 |

FOREIGN PATENT DOCUMENTS

| | | | |
|---|---|---|---|
| CN | 102591521 | B | 3/2016 |
| CN | 108279737 | A | 7/2018 |
| CN | 210270841 | U | 4/2020 |
| CN | 210270842 | U | 4/2020 |
| CN | 210489811 | U | 5/2020 |
| CN | 111367435 | A | 7/2020 |
| CN | 111857430 | A | 10/2020 |
| CN | 112306273 | A | 2/2021 |
| CN | 112578925 | A | 3/2021 |
| CN | 112578926 | A | 3/2021 |
| CN | 112612323 | A | 4/2021 |
| CN | 112750870 | A | 5/2021 |
| CN | 112764583 | A | 5/2021 |
| CN | 112864204 | A | 5/2021 |
| CN | 112882572 | A | 6/2021 |
| CN | 112947780 | A | 6/2021 |
| CN | 113035924 | A | 6/2021 |
| CN | 113131179 | A | 7/2021 |
| CN | 113296635 | A | 8/2021 |
| CN | 114553993 | A | 5/2022 |
| JP | 2003204281 | A | 7/2003 |
| JP | 2018025756 | A | 2/2018 |
| JP | 2020201486 | A | 12/2020 |
| JP | 2021060570 | A | 4/2021 |
| KR | 1020160118418 | A | 10/2016 |
| KR | 1020200008408 | A | 1/2020 |
| WO | 2021151483 | A1 | 8/2021 |

OTHER PUBLICATIONS

Office Action issued on Jul. 28, 2023, in corresponding Taiwanese Application No. 111133225; 7 pages (partial English provided).
Office Action issued on Jan. 20, 2025, in corresponding Korean Application No. 10-2023-7036258, 12 pages.
Office Action issued on Oct. 15, 2024, in corresponding Japanese Application No. 2023-566726, 16 pages.
Office Action issued on Feb. 20, 2025, in corresponding Chinese Application No. 202210286830.X, 7 pages, with partial English translation.
Extended Search Report issued on Feb. 26, 2025, in corresponding European Application No. 22913415.0, 8 pages.
Notice of Allowance issued on Jun. 20, 2025, in corresponding Chinese Application No. 202210286830.X, 9 pages.
Li et al., "Smooth tracking with a kalman filter algorithm for capacitive touch panels", Journal of Jilin University (Engineering and Technology Edition), Nov. 2018, vol. 48, No. 6, pp. 1910-1916, with English abstract.
Sun et al., "Analysis of Monopole Antennas on Circular Disk Using Mode Matching Method", Acta Electronica Sinica, Jun. 2001, vol. 29, No. 6, pp. 832-834, with English Abstract.

* cited by examiner

A-A

A-A

DISPLAY PANEL AND DISPLAY APPARATUS

CROSS-REFERENCE TO RELATED APPLICATIONS

The present application is a continuation of International Application No. PCT/CN2022/113694, filed on Aug. 19, 2022, which claims priority to Chinese Patent Application No. 202111607714.5 filed on Dec. 27, 2021, and titled "DISPLAY PANEL AND DISPLAY APPARATUS", and Chinese Patent Application No. 202210286830.X, filed on Mar. 23, 2022, and titled "DISPLAY PANEL AND DISPLAY APPARATUS", both of which are incorporated herein by reference in their entireties.

TECHNICAL FIELD

The present application relates to the field of display technology, and in particularly to a display panel and a display apparatus.

BACKGROUND

An antenna is an important part of an intelligent terminal device such as a smart phone. With the vigorous development of mobile communication technology, 5G communication technology is gradually getting popular. However, the popularity of 5G communication technology results in a significant increase in the number of antennas of the mobile phone, while the frame of the mobile phone is getting narrower, the mobile phone is getting thinner, and the internal space of the mobile phone is compressed, so that the space for placing the antennas in the mobile phone is seriously insufficient. Therefore, an efficiency of communication through the antennas of the mobile phone is lower, and challenges caused by the antennas of the mobile phone to engineers are getting increased.

SUMMARY

The present application provides a display panel and a display apparatus.

In a first aspect, embodiments of the present application provide a display panel, and the display panel includes a first display area and a second display area, the second display area includes a first area and at least one second area adjacent to each other, a first antenna is arranged in the first area, and a second antenna is arranged in the at least one second area; and the display panel further includes a plurality of touch electrodes arranged in the first display area and the at least one second area.

In another aspect, embodiments of the present application provide a display apparatus including the display panel according to any of the above embodiments.

DETAILED DESCRIPTION

An antenna is an important part of an intelligent terminal, and a communication function of the intelligent terminal is realized through the antenna. Under a condition that the antenna is provided, a certain clearance area is required to be ensured, so as to prevent other components from affecting a communication effect of the antenna. However, a large number of antennas are required in 5G communication technology, which is contrary to requirements for a smart terminal such as a smart phone of being light, thin, small and beautiful in design. Due to an insufficient clearance area for the antenna in the mobile phone, the mobile phone communication, especially the high frequency communication, is vulnerable to interference, so that the communication effect is affected. Accordingly, how to arrange more antennas in a relative small mobile phone to improve the communication efficiency of the smart terminal such as the mobile phone is a difficulty.

Based on this, embodiments of the present application provide a display panel and a display apparatus, so that the technical problem caused by insufficient space for placing an antenna in an intelligent terminal device can be solved.

With reference to FIG. 1 to FIG. 7, the display panel 100 includes a first display area PL and a second display area BE, the second display area BE includes a first area BE1 and a second area BE2 adjacent to each other, a first antenna 120 is arranged in the first area BEL and a second antenna 130 is arranged in the second area BE2. The display panel 100 further includes touch electrodes arranged in the first display area PL and the second area BE2.

Specifically, relative positions and corresponding shapes of the first display area PL and the second display area BE are different according to differences in shapes of the display panel 100.

In an example, the first display area PL may be a rectangle, a circle, an oval, and the like in shape. The second display area BE may be provided on the periphery of the first display area PL or may be provided in the first display area PL, which may be selected according to requirements. Under a condition that the second display area BE is provided on the periphery of the first display area PL, the second display area BE may be provided around the entire first display area PL, or may be provided around a part of the periphery of the first display area PL. Optionally, under a condition that the first display area PL is a rectangle in shape, the second display area BE may be provided on one or more sides of the first display area PL.

Optionally, the first display area PL may be a flat display area or a curved display area, and the second display area BE may also be a flat display area or a curved display area. Specific shapes of the first display area PL and the second display area BE may be selected according to actual requirements.

Figure 1:
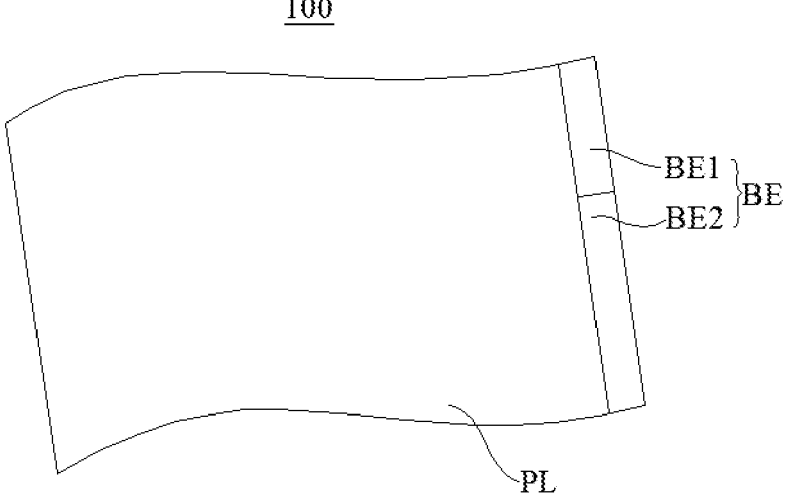
FIG. 1 is a schematic structural view of a display panel according to an embodiment of the present application.
Figure 2:
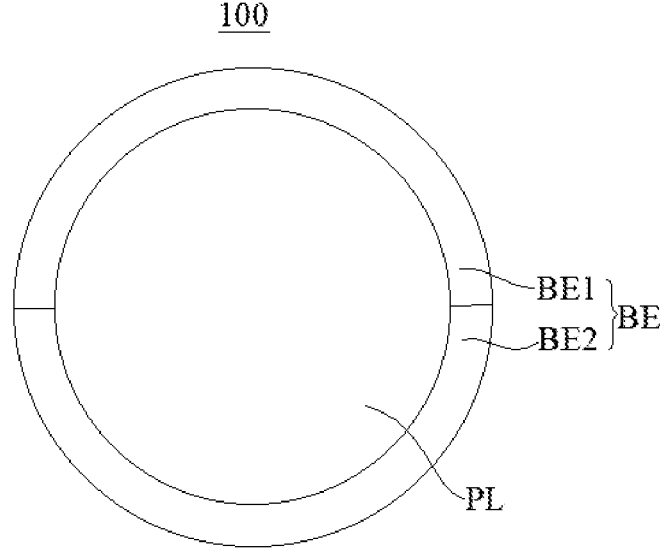
FIG. 2 is a schematic structural view of another display panel according to an embodiment of the present application.
Figure 3:
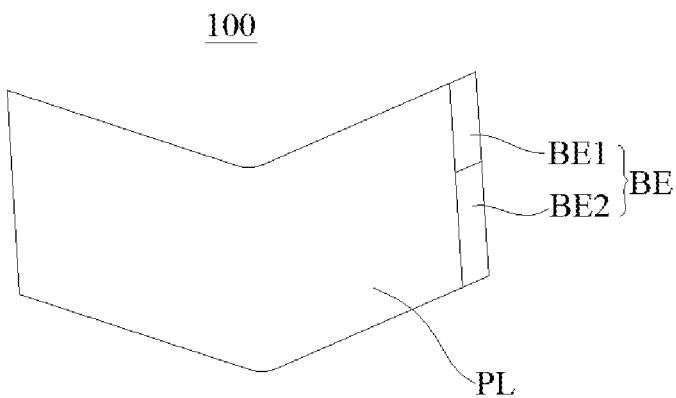
FIG. 3 is a schematic structural view of yet another display panel according to an embodiment of the present application.
Figure 4:
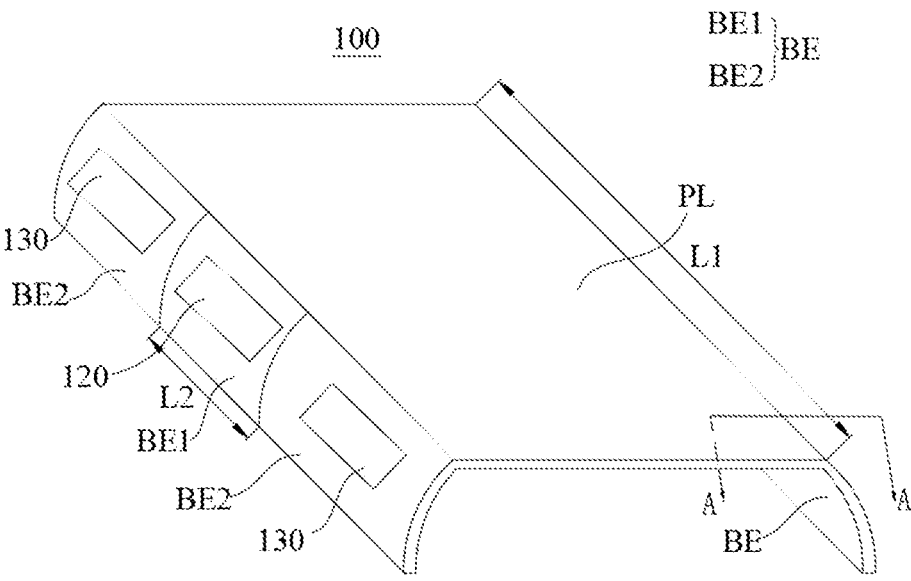
FIG. 4 is a schematic structural view of yet another display panel according to an embodiment of the present application.
Figure 5:
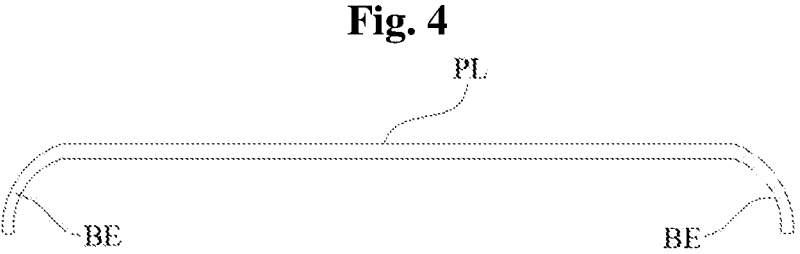
FIG. 5 is a front view of the display panel in FIG. 4.

In some embodiments, as shown in FIG. 1, the first display area PL and the second display area BE may be curved display areas. Under a condition that the corresponding display panel 100 is applied to a display apparatus, the display apparatus is a curved display apparatus or a flexible display apparatus. In some other embodiments, as shown in FIG. 2, the first display area PL and the second display area BE may be flat display areas. Under a condition that the corresponding display panel 100 is applied to a display apparatus, the display apparatus is a flat display apparatus. In some embodiments, as shown in FIG. 4, the first display area PL is a flat display area, and the second display area BE is a curved display area, for example, which is formed by bending an edge of the first display area PL. In this way, the object of the present application can still be achieved.

Optionally, the first display area PL may be folded or may not be folded. An example is given in FIG. 3 to show that the first display area PL of the display panel 100 is folded.

The display panel 100 may be an organic light emitting diode (OLED) display panel 100 or a liquid crystal display (LCD) display panel 100.

The first antenna 120 may be a patterned structure, and the second antenna 130 may also be a patterned structure, and patterns of the first antenna 120 and the second antenna 130 may be set according to actual requirements, which is not limited in the present application.

Touch electrodes 110a are arranged in the second area BE2, that is, the second area BE2 has a touch function. A touch form of the second area BE2 may be self-capacitance or mutual capacitance, and different touch forms correspond to different structural forms of the touch electrodes 110a.

Figure 6:
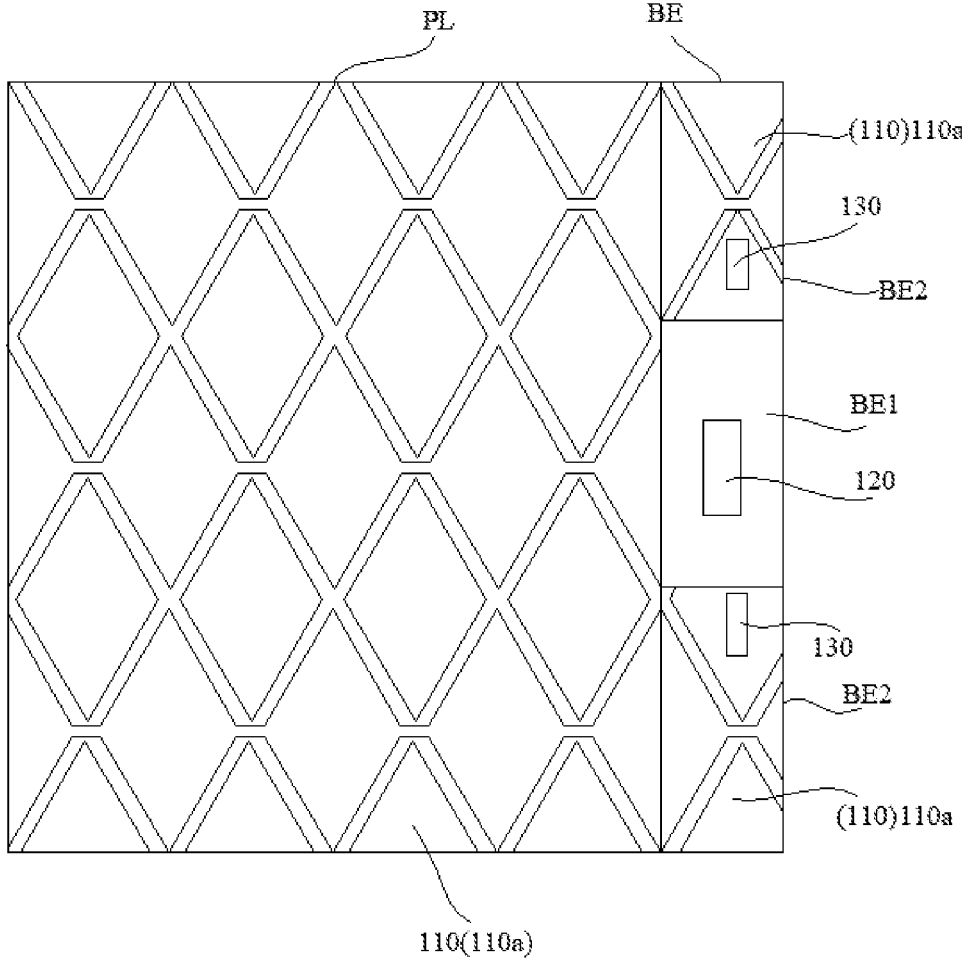
FIG. 6 is a partial schematic structural view of a display panel according to an embodiment of the present application.

With reference to FIG. 6, in some embodiments, the touch form of the second area BE2 is mutual capacitance. Under this condition, the touch electrodes 110a may be a plurality of electrode blocks arranged on a same layer and distributed in an array, and touch electrodes 110a in a same matrix row or a same matrix column are electrically connected to each other.

In some other embodiments, the touch form of the second area BE2 is self-capacitance. Under this condition, the touch electrode 110a includes a touch driving electrode and a touch sensing electrode insulated from each other. One of the touch driving electrode and the touch sensing electrode extends along a row direction, the other of the touch driving electrode and the touch sensing electrode extends along a column direction, and a capacitance can be generated at a position where the two intersect.

With reference to FIG. 6, the second antennas 130 and the touch electrodes 110a are arranged in the second area BE2 of the second display area BE, that is, the second area BE2 has both the touch function and the antenna function. Only the first antenna 120 is arranged in the first area BE1 of the second display area BE, so that the first area BE1 only has the antenna function, but does not have the touch function. Accordingly, a risk caused by a mis-touch in the first area BE1 to affect the antenna function of the first area BE1 can be reduced, and the first area BE1 has a sufficient space for arranging the first antenna 120.

It should be noted that when the second area BE2 samples an antenna signal and a touch signal, the second area BE2 may sample the antenna signal and the touch signal at the same time or alternately. In some embodiments, to avoid mutual interference between two signals, a method of time division multiplexing may be used to sample the antenna signal and the touch signal in the second area BE2.

Specifically, the antenna signal and the touch signal may be sampled based on a same time period, and as long as a sampling pulse width is narrow enough, a certain time gap will be left between two sampling values of a same signal. Under a condition that a sampling moment of the other signal is exactly in the time gap, sampling values of the two signals do not overlap in time. Optionally, a sampling period of the antenna signal and the touch signal may be set to any value between 1 μs and 10 ms, which may be selected according to specific requirements. The antenna signal and the touch signal are sampled by using the control method, so that the second antenna 130 and the touch electrode 110a can share the same space, so as not only to achieve both the antenna function and the touch function for the second area BE2, but also to avoid mutual signal interference caused by performing the alternate collection of the antenna signal and the touch signal.

The first antenna 120 is arranged in the first area BE1 of the second display area BE, and a position of the first area BE1 in the display panel 100 may be set according to actual situations, so as to achieve a higher screen-to-body ratio for the display panel 100; only the first antenna 120 is arranged in the first area BE1, so that the first area BE1 only has a function of receiving or sending a signal, but does not have a touch function. In this way, a sufficient clearance space is provided for the first antenna 120, a communication efficiency of the first antenna 120 can be improved, and a risk caused by the mis-touch is reduced. In addition, since only the first antenna 120 is arranged in the first area BE1, and the touch electrode 110a is not arranged in the first area BE1, different from the way in which the second antenna 130 and the touch electrode 110a alternately perform the collection of the antenna signal and the touch signal, the first antenna 120 can continuously receive and send information, that is, the antenna function can be achieved continuously for the first antenna 120.

Optionally, the first antenna 120 and the second antenna 130 may be mi-wave antennas; the first antenna 120 may be a main antenna, and the second antenna 130 may be an auxiliary antenna, so as to enhance a signal of the first antenna 120; under a condition that the second antenna 130 is reused as the touch electrode 110a, the first antenna 120, that is, the main antenna, can communicate independently.

In the display panel 100 according to the embodiments of the present application, the first antenna 120 is arranged in the first area BE1 of the second display area BE, the second antenna 130 is arranged in the second area BE2 of the second display area BE, and the touch electrode 110a is also arranged in the second area BE2, that is, the antennas are integrated in the second display area BE of the display panel 100, so that both the display function and the antenna function can be achieved for the second display area BE without providing separate antenna areas, which is not only beneficial for making the display panel 100 light and thin, but also for a high screen-to-body ratio design of the display panel 100. Herein only the first antenna 120 is arranged in the first area BE1, so that the space for arranging the first antenna 120 is ensured, and a risk caused by the mis-touch in the first area BE1 to affect a function of the first antenna 120 can be reduced. In addition, both the second antenna 130 and the touch electrode 110a are arranged in the second area BE2, that is, both the display function and the antenna function can be achieved for the second area BE2. Therefore, while the touch control function of the second area BE2 is not affected, the second area BE2 is reasonably used for better antenna integration design, thereby improving the communication efficiency of the display panel 100.

A number of first areas BE1 and second areas BE2 in the second display area BE may be selected according to requirements. There may be one first area BE1 and one second area BE2, or a plurality of first areas BE1 and a plurality of second areas BE2, and the plurality of first areas BE1 or the plurality of second areas BE2 are distributed alternately. Shapes and sizes of the plurality of first areas BE1 may be same or different, which are set according to actual requirements.

In some embodiments, the second display area BE is arranged to be a bar in shape and extends along an edge of the first display area PL.

Specifically, the second display area BE may be a bar in different shapes according to shapes of the edge of the first display area PL. For example, the edge of the first display area PL is an arc in shape, then the second display area BE is a bar in the shape of an arc, and the edge of the second display area PL is a straight line in shape, then the second display area BE is a bar in the shape of a straight line, that is, the second display area BE extends along a straight line.

Optionally, the second display area BE may be a flat display area or a curved display area.

The second display area BE is arranged at the edge of the first display area PL, so that the first antenna 120 and the second antenna 130 are integrated in the second display area BE, and the first antenna 120 and the second antenna 130 are arranged in the second display area BE in the shape of the bar, so that the second display area BE has both the display function and the antenna function. Accordingly, a high screen-to-body ratio is achieved for the display panel.

In some embodiments, along an extending direction X of the second display area BE, the first area BE1 is located in the middle of the corresponding second display area BE, and at least two second areas BE2 are provided respectively at two sides of the first area BE1.

In an example, one first area BE1 and two second areas BE2 may be provided, the two second areas BE2 are respectively located at two sides of the first area BE1 along the extending direction X. Two first areas BE1 and three second areas BE2 may also be provided, the two first areas BE1 and the three second areas BE2 are distributed alternately along the extending direction X. Of course, more first areas BE1 and more second areas BE2 may also be provided, which may be selected according to specific arrangement requirements.

Accordingly, the second areas BE2 may be provided at two ends of the second display area BE along the extending direction X, so that performing a touch operation on the second display area BE may be more convenient for an operator.

In some optional embodiments, an extension length of the second display area BE is L1, and a length of the first area BE1 along the extending direction X of the second display area BE is L2, where $30\% \le L2/L1 \le 50\%$.

Specifically, with reference to FIG. 4, the second display area BE has one first area BE1 and two second areas BE2 located at two ends of the first area BE1 along the extending direction X. Since the first area BE1 only has the antenna function, and does not have the touch function or is not provided with a touch-related device, and the second area BE2 has the touch function, and a touch operation is not required to be performed on the first area BE1, the first area BE1 is provided at a position close to the middle of the second display area BE, further reducing the risk caused by the mis-touch in the first area BE1. Meanwhile, the second areas BE2 are provided at two ends of the second display area BE along the extending direction X thereof, and since the second area BE2 has the touch function, performing the touch operation on the second display area BE may be more convenient for the operator.

In an example, the first area BE1 is located at the middle of the second display area BE along the extending direction X, and the second areas BE2 at two ends have a same extension length along the extending direction X.

L2/L1 may be 30%, 35%, 40%, 45%, or 50%, and the like. In an example, the first area BE1 and the second areas BE2 at two ends may divide the second display area BE into three equal sections. Accordingly, the second display area BE can be ensured to have a sufficient space in the first area BE1 for arranging the first antenna 120, so that a risk caused by an operator's mis-touch in the first area BE1 is reduced, and meanwhile, the second area BE2 has the touch function, so that performing a touch operation on the second areas BE2 of the second display area BE may be more convenient for the operator.

The first antenna 120, the second antenna 130 and the touch electrode 110a may be arranged on a same layer or on different layers, which may be selected according to specific requirements. In an example, the first antenna 120 and the second antenna 130 may be arranged on a same layer, and the touch electrode 110a is arranged on a layer different form the layer on which the first antenna 120 and the second antenna 130 are arranged.

In some embodiments, the second antenna 130 and the touch electrode 110a are arranged on a same layer.

Figure 7:
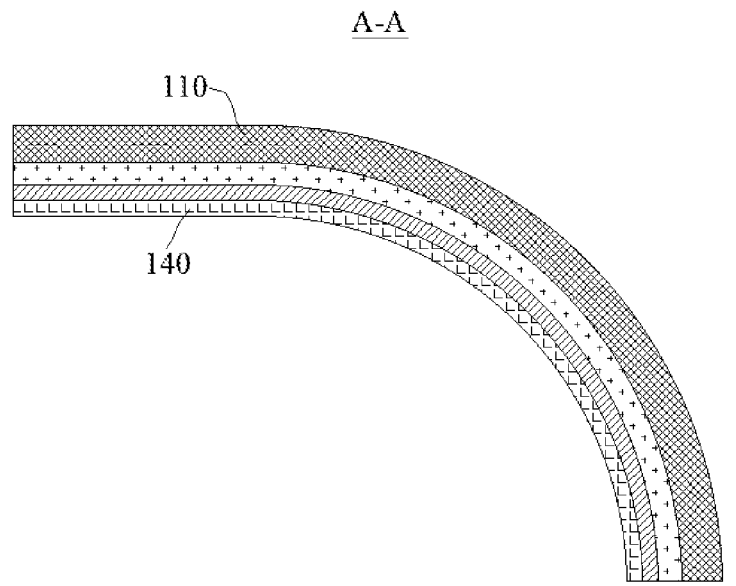
FIG. 7 is a partial cross-sectional view along the line A-A in FIG. 4.
Figure 9:
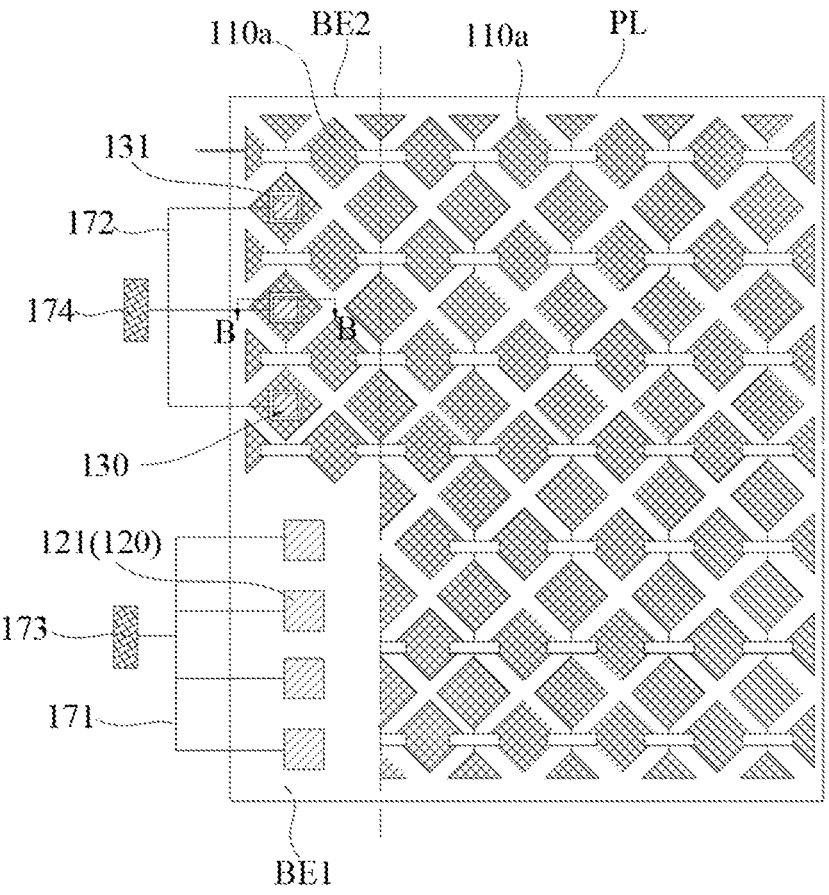
FIG. 9 is a partial schematic structural view of a display panel under a flattened state according to another embodiment of the present application.
Figure 10:
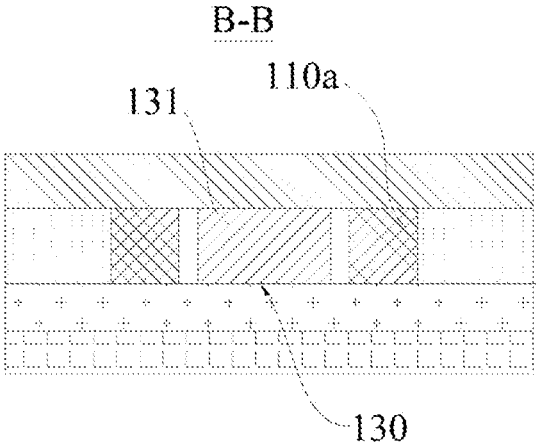
FIG. 10 is a partial cross-sectional view along the line B-B in FIG. 9.

Specifically, with reference to FIG. 6 and FIG. 7, the display panel 100 includes a base substrate 140 and a touch layer 110 arranged at a side of the base substrate 140. The base substrate 140 may include a light-emitting structure. The touch electrode 110a is arranged on the touch layer 110. The second antenna 130 is also arranged on the touch layer 110. With reference to FIG. 9 and FIG. 10, an embodiment is given to show the touch electrode 110a and the second antenna 130 are arranged on a same layer.

According to different touch forms of the second areas BE2, the display panel 100 may include one touch layer 110 or a plurality of touch layers 110, touch electrodes 110a in the second areas BE2 may be arranged in two or more touch layers 110, and second antennas 130 may be arranged in any film layer in the touch layers 110 and is spaced apart from a touch electrode 110a or a lead of the film layer, so as to reduce mutual signal interference.

The second antenna 130 and the touch electrode 110a are arranged in the same layer, and a gap between corresponding touch electrodes 110a in the touch layer 110 may be used to arrange the second antennas 130, so that the touch function is achieved for the second area BE2 or an electrical signal for achieving the touch function and an antenna function are provided without arranging a separate film layer for the second antenna 130, thereby effectively reducing a thickness of the display panel 100.

In an example, under condition that the touch form of the second area BE2 is self-capacitance, the touch layer 110 includes a touch driving electrode layer and a touch sensing electrode layer insulated from each other, and the second antenna 130 may be arranged on the touch driving electrode layer or may also be arranged on the touch sensing electrode layer.

Optionally, the touch form of the second area BE2 may also be mutual capacitance. Under this condition, the touch layer 110 may include a touch electrode layer and a bridging layer, and the touch electrode 110a is arranged on the touch electrode layer. Under this condition, the second antenna 130 may be arranged on the touch electrode layer.

With the above arrangements, both the touch function and the antenna function can be achieved for the second area BE2 while the thickness of the display panel 100 is reduced.

In the embodiment where the second antenna 130 and the touch electrode 110a are arranged on the same layer, the first antenna 120, the second antenna 130 and the touch electrode 110a may be arranged on the same layer, or the first antenna 120 may be arranged on a layer different form a layer on which the second antenna 130 and the touch electrode 110a are arranged, so that the antenna function can be achieved for the first area BE1.

In some embodiments, the first antenna 120 and the touch electrode 110a are arranged on the same layer. That is, the first antenna 120, the second antenna 130, and the touch electrode 110a are arranged on the touch layer 110, thereby further reducing the thickness of the display panel 100.

Specifically, the touch electrodes 110a are arranged in the first display area PL and in the second area BE2, and the first antenna 120 and the second antenna 130 are arranged in the second display area BE, then a film layer of the second display area BE and a film layer corresponding to the first display area PL can be formed together. Accordingly, the thickness of the display panel 100 may be further reduced.

In some other embodiments, the display panel 100 includes a touch layer 110 and an antenna layer arranged in a stack, the touch electrode 110a is arranged on the touch layer, and the second antenna 130 is arranged on the antenna layer.

That is, the touch electrode 110a and the second antenna 130 are arranged in different layers, or may be located in adjacent film layers or may be spaced apart by one or more film layers.

The touch electrode 110a and the second antenna 130 are arranged on different film layers, so that a difficulty for processing the display panel 100 can be reduced, and a risk caused by short circuit of the second antenna 130 and the touch electrode 110a is reduced.

Figure 8:
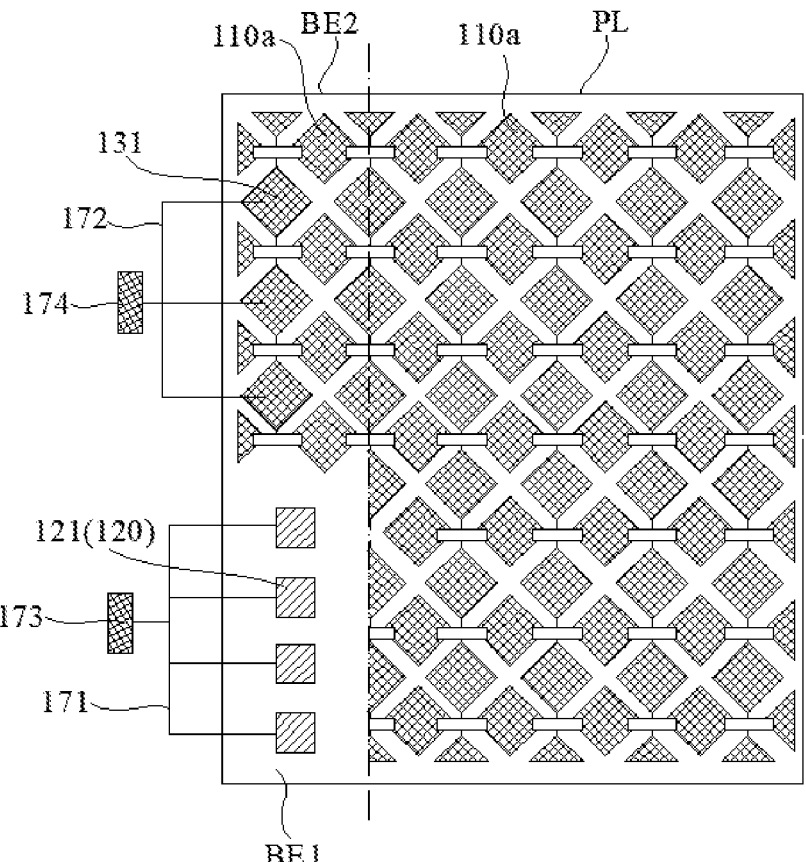
FIG. 8 is a partial schematic structural view of a display panel under a flattened state according to an embodiment of the present application.

In some embodiments, as shown in FIG. 8, the first antenna 120 includes at least one first antenna unit 121, and the second antenna 130 includes one or more second antenna units 131.

Optionally, a structure may be reused by the second antenna unit 131 and the touch electrode 110a in the second area BE2, or structures may be provided for the second antenna unit 131 and the touch electrode 110a, respectively.

Specifically, the first antenna 120 may be connected to a first antenna terminal 173 through a first wiring 171.

In some embodiments, at least a part of the touch electrodes 110a in the second area BE2 are reused as the second antenna unit 131.

The structure reused as the touch electrode 110a of the second antenna unit 131 may be connected to a second antenna terminal 174 through a second wiring 172. Since the method of time division multiplexing may be used to sample the touch signal and the antenna signal in the second area BE2 respectively, a structure reused by the touch electrode 110a and the second antenna unit 131 does not cause signal interference, and can further simplify a structure of the display panel 100. Optionally, the display panel 100 further includes a touch binding terminal, and the touch electrode 110a is connected to the touch binding terminal through a touch wiring, which is not described in detail.

In some other embodiments, as shown in FIG. 9 and FIG. 10, the second antenna 130 includes the second antenna unit 131, and the second antenna unit 131 is spaced apart from the touch electrode 110a, which specifically means that the second antenna unit 131 is spaced apart and insulated from a conductive material forming the touch electrode 110a.

In an example, the touch form of the display panel 100 is mutual capacitance, a plurality of touch electrodes 110a are distributed on a same layer in an array, and the touch electrodes 110a in a same matrix row or in a same matrix column are electrically connected to each other. One of second antenna units 131 or a plurality of second antenna units 131 are electrically connected to form an antenna pattern to achieve a corresponding antenna function. The second antenna unit 131 and the touch electrode 110a are spaced apart from each other, then the second antenna unit 131 and the touch electrode 110a do not conduct electricity to each other, and thus do not cause signal interference with each other. Accordingly, both the touch function and the antenna function are achieved for the second area BE2 while the thickness of the display panel 100 is further reduced.

The second antenna unit 131 may be arranged between two adjacent touch electrodes 110a, the second antenna unit 131 may be arranged around the touch electrodes 110a, or the touch electrode 110a may be arranged around the second antenna unit 131.

In some optional embodiments, with further reference to FIG. 9 and FIG. 10, at least a part of the touch electrodes 110a are arranged around the second antenna unit 131.

Specifically, the second antenna units 131 are distributed in one row or one column, or the second antenna units 131 are distributed in a matrix, and at least a part of the touch electrodes 110a are arranged around the second antenna unit 131, that is, the second antenna unit 131 is arranged in corresponding touch electrode 110a.

A portion of the touch electrodes 110a are arranged around the second antenna unit 131, so that a distribution pattern of the touch electrode 110a is not disturbed while the thickness of the display panel 100 is reduced, so as to ensure a touch sensitivity of the second area BE2.

The first antenna 120 and the second antenna 130 may respectively be a long-wave antenna, a medium-wave antenna, a short-wave antenna, an ultra-short-wave antenna or a microwave antenna, which may be selected according to actual requirements.

In some embodiments, the first antenna 120 and the second antenna 130 are millimeter-wave antennas, the first antenna 120 is the main antenna, and the second antenna 130 is the auxiliary antenna and used to enhance the signal of the first antenna.

Specifically, the function achieved by the first antenna 120 and the second antenna 130 is same, and the second antenna 130 may increase an efficiency of transmitting the signal by the first antenna 120, so that the corresponding antenna function has a better effect.

In some other embodiments, the first antenna 120 and the second antenna 130 may be non-millimeter-wave antennas, and the first antenna 120 and the second antenna 130 may specifically constitute one or more of antennas used in Bluetooth, Wireless Network Communication Technology (Wi-Fi), a Global Positioning System (GPS), Near Field Communication (NFC), and a laser-direct-structuring (LDS).

In some embodiments, the first antenna 120 is an NFC antenna. That is, a near field communication function of the display apparatus is achieved by the first antenna 120.

The second antenna 130 and the first antenna 120 may be a same type of antennas, or may be different types of antennas, which may be set according to actual requirements.

In some embodiments, the second antenna 130 is a NFC antenna. That is, a near field communication signal of the display panel 100 is enhanced by the second antenna 130, so that a near field communication efficiency of the display panel 100 is increased.

In some embodiments, the display panel 100 further includes an antenna layer, and the first antenna 120 and/or the second antenna 130 are/is arranged on the antenna layer.

That is, at least one of the first antenna 120 and the second antenna 130 is arranged on the antenna layer, the other of the first antenna 120 and the second antenna 130 is arranged on another film layer, or both the first antenna 120 and the second antenna 130 are arranged on the antenna layer.

There may be one antenna layer or a plurality of antenna layers. Under a condition that there is one antenna layer, both the first antenna 120 and the second antenna 130 may be arranged on the antenna layer, or one of the first antenna 120 and the second antenna 130 may be arranged on the antenna layer. Under a condition that there are the plurality of antenna layers, the first antenna 120 and the second antenna 130 may be arranged on different antenna layers or may be arranged on a same antenna layer.

The antenna layer is arranged to facilitate the arrangement of a corresponding first antenna 120 and/or a corresponding second antenna 130, thereby reducing the difficulty for processing the display panel 100.

Figure 11:
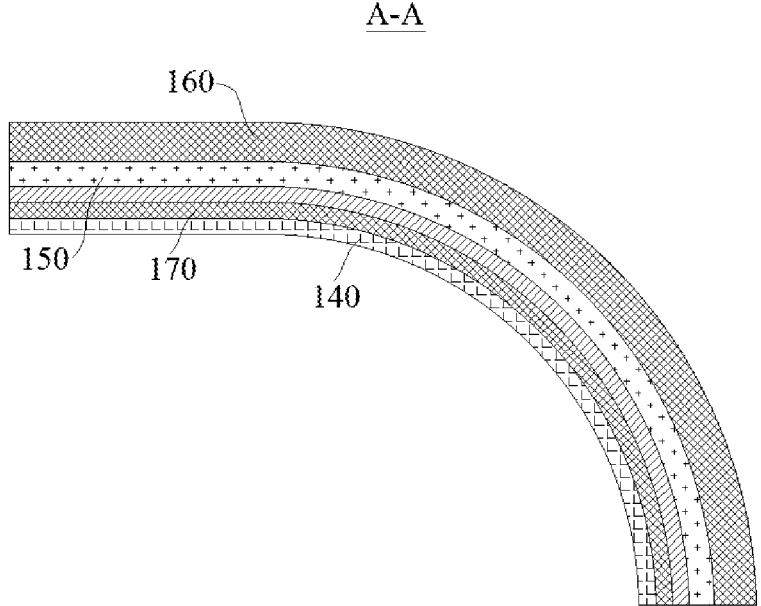
FIG. 11 is another partial cross-sectional view along the line A-A in FIG. 4.

In some embodiments, as shown in FIG. 4 and FIG. 11, the display panel 100 includes the base substrate 140, a light-emitting layer and a polarizing layer 150 arranged in sequence at a side of the base substrate 140, and the first antenna 120 is arranged on the polarizing layer 150.

That is, the first antenna 120 is integrated in the polarizing layer 150 without providing a separate film layer, thereby further reducing the thickness of the display panel 100. In the solution that the first antenna 120 is arranged on the polarizing layer 150, a signal interference between the first antenna 120 and other film layer-related components can be reduced, and the communication efficiency of the display panel 100 is improved.

In the embodiment that the first antenna 120 is arranged on the polarizing layer 150, the second antenna 130 may be arranged on the polarizing layer 150, or may be arranged on other film layers, which may be set according to actual requirements.

In some embodiments, the second antenna 130 is arranged on the polarizing layer 150. As such, the first antenna 120 and the second antenna 130 are integrated in a same film layer, thereby further reducing the thickness of the display panel 100.

In some embodiments, with further reference to FIG. 4 and FIG. 11, the display panel 100 includes the base substrate 140, a light-emitting layer and an encapsulation layer 160 arranged in sequence at a side of the base substrate 140, and the first antenna 120 is arranged on the encapsulation layer 160.

That is, in addition to integrating the first antenna 120 in the polarizing layer 150, the first antenna 120 may also be integrated in the encapsulation layer 160 without providing a separate film layer, so that the thickness of the display panel 100 can still be reduced. In the solution that the first antenna 120 is arranged on the encapsulation layer 160, a signal interference between the first antenna 120 and other film layer-related components can still be reduced, and the communication efficiency of the display panel 100 is improved.

In some embodiments, the second antenna 130 is arranged on the encapsulation layer 160. As such, a thickness of the film layers of the display panel 100 can be reduced.

In an embodiment that the display panel 100 includes both the polarizing layer 150 and the encapsulation layer 160, the polarizing layer 150 is arranged at a side of the base substrate 140, and the encapsulation layer 160 is arranged at a side of the polarizing layer 150 away from the base substrate 140. Under this condition, the first antenna 120 and the second antenna 130 may be arranged on the encapsulation layer 160, or may be arranged on the polarizing layer 150, or one of the first antenna 120 and the second antenna 130 may be arranged on the encapsulation layer 160 and the other of the first antenna 120 and the second antenna 130 may be arranged on the polarizing layer 150, which may be selected according to actual requirements.

The polarizing layer 150 is arranged at a side of the base substrate 140, this does not mean that the polarizing layer 150 is arranged directly on a surface of the base substrate 140, instead it means that other film layers may be arranged between the polarizing layer 150 and the base substrate 140. Other film layers may further be arranged between the encapsulation layer 160 and the polarizing layer 150.

In some embodiments, with further reference to FIG. 4 and FIG. 11, the display panel 100 includes an array substrate 170 and a light-emitting layer arranged in sequence at a side of the base substrate 140, and the first antenna 120 and/or the second antenna 130 are/is arranged on the array substrate 170. That is, at least one of the first antenna 120 and the second antenna 130 is integrated in the array substrate 170 of the display panel 100, so that the purpose of reducing the thickness of the display panel 100 can still be achieved.

In some embodiments, the array substrate 170 includes a metal layer, and the first antenna 120 and/or the second antenna 130 are/is arranged on the metal layer. That is, at least one of the first antenna 120 and the second antenna 130 is arranged on the metal layer. The array substrate 170 includes at least two metal layers, and the first antenna 120 and the second antenna 130 may be arranged on a same metal layer or different metal layers.

According to differences in the structure of the display panel 100, one second display area BE may be arranged in the display panel 100, or a plurality of second display areas BE may be arranged in the display panel 100. In an embodiment that the plurality of second display areas BE are arranged in the display panel 100, the plurality of second display areas BE may be adjacent to each other or may be spaced apart from each other. In an example, two second display areas BE of the display panel 100 are arranged at two sides of the first display area PL opposing to each other, that is, the two second display areas BE are arranged in parallel.

In an embodiment that the plurality of second display areas BE are arranged in the display panel 100, the first antenna 120 and the second antenna 130 may be arranged in each second display area BE, or the first antenna 120 and the second antenna 130 may be arranged in a portion of the second display areas BE, which may be selected according to specific requirements.

In some embodiments, the display panel 100 includes at least two second display areas BE, and the first area BE1 and the second area BE2 are arranged in at least one of the second display areas BE.

Specifically, the at least one of the second display areas BE includes the first area BE1 and the second area BE2, the first antenna 120 is arranged in the first area BE1, and the second antenna 130 and the touch electrode 110a are arranged in the second area BE2. Other second display areas BE may only have the display function, or may have both the display function and the touch function.

The first antennas 120 and the second antennas 130 are arranged in at least one second display area BE, and the first antennas 120 and the second antennas 130 may be arranged in the plurality of second display areas BE according to actual requirements, so that a sufficient space is provided for arranging the first antennas 120 and the second antennas 130, and the communication efficiency of the display panel 100 is further improved.

As shown in FIG. 4, in some embodiments, the first display area PL is the flat display area, and the second display area BE is the bent display area.

Specifically, after the bent display area is integrated with the flat display area, the bent display area may be formed by bending an edge of the flat display area, and the first antenna 120 and the second antenna 130 are arranged in the bent display area. The first antenna 120 and the second antenna 130 are arranged respectively based on a position of the bent display area without occupying a position and a space of the flat display area or a non-display area, which is beneficial for improving the screen-to-body ratio of the display panel 100.

In some embodiments, the display panel 100 includes at least two bent display areas, and the first area BE1 and the second area BE2 are arranged in at least one of the at least two bent display areas. That is, the first area BE1 and the second area BE2 may be formed in one bent display area, and of course, may be formed in different bent display areas, respectively. As such, positions of the first antenna 120 and the second antenna 130 can be appropriately provided according to actual requirements.

The display apparatus according to the embodiments of the present application includes the display panel 100 according to any of the above embodiments.

Due to the use of the display panel 100 according to any of the above embodiments, the display apparatus according to the embodiments of the present application has the same technical effect, which is not repeated here.

What is claimed is:

1. A display panel comprising:
   a first display area;
   a second display area comprising a first area and at least one second area adjacent to each other;
   a first antenna arranged in the first area;
   a second antenna arranged in the at least one second area; and
   a plurality of touch electrodes arranged in the first display area and the at least one second area;
   wherein at least one of the first antenna and the second antenna are arranged in a same layer as the plurality of touch electrodes, and
   wherein the first antenna comprises a first antenna unit; the second antenna comprises a second antenna unit, and at least a part of the plurality of touch electrodes in the at least one second area are reused as the second antenna unit; or, at least a part of the plurality of touch electrodes are arranged around the second antenna unit.

2. The display panel according to claim 1, wherein the second display area is arranged to be a bar in shape and extends along an edge of the first display area.

3. The display panel according to claim 2, wherein the second display area extends along a straight line.

4. The display panel according to claim 2, wherein the at least one second area comprises at least two second areas, and along an extending direction of the second display area, the first area is located in the middle of the corresponding second display area, and the at least two second areas are respectively provided at two sides of the first area.

5. The display panel according to claim 2, wherein an extension length of the second display area is L1, and an extension length of the first area along an extending direction of the second display area is L2, wherein $30\% \leq L2/L1 \leq 50\%$.

6. The display panel according to claim 1, wherein the first antenna and the second antenna are millimeter-wave antennas; the first antenna is a main antenna, and the second antenna is an auxiliary antenna to enhance a signal of the first antenna.

7. The display panel according to claim 1, wherein the first antenna is one or more of a Bluetooth antenna, a wireless network communication technology antenna, a global positioning system antenna, a near field communication antenna and a laser-direct-structuring antenna; and the second antenna is one or more of a Bluetooth antenna, a wireless network communication technology antenna, a global positioning system antenna, a near field communication antenna and a laser-direct-structuring antenna.

8. The display panel according to claim 1, further comprising an antenna layer, wherein at least one of the first antenna and the second antenna are arranged in the antenna layer.

9. The display panel according to claim 1, further comprising a base substrate, and a light-emitting layer and a polarizing layer arranged in sequence at a side of the base substrate, wherein at least one of the first antenna and the second antenna are arranged in the polarizing layer.

10. The display panel according to claim 1, further comprising a base substrate, and a light-emitting layer and an encapsulation layer arranged in sequence at a side of the base substrate, wherein at least one of the first antenna and the second antenna are arranged in the encapsulation layer.

11. The display panel according to claim 1, wherein the display panel comprises a base substrate, and an array substrate and a light-emitting layer arranged in sequence at a side of the base substrate, wherein at least one of the first antenna and the second antenna are arranged on the array substrate.

12. The display panel according to claim 11, wherein the array substrate comprises a metal layer, and at least one of the first antenna and the second antenna are arranged in the metal layer.

13. The display panel according to claim 1, wherein the display panel comprises at least two second display areas, and the first area and the at least one second area are provided in at least one of the second display areas.

14. The display panel according to claim 1, wherein the first display area is a flat display area, and the second display area is a bent display area.

15. The display panel according to claim 14, wherein the display panel comprises at least two bent display areas, the first area and the at least one second area are provided in at least one of the bent display areas.

16. A display apparatus comprising the display panel according to claim 1.

\* \* \* \* \*